United States Patent [19]

Jakob et al.

[11] Patent Number: 4,483,947

[45] Date of Patent: Nov. 20, 1984

[54] MOLDING COMPOSITIONS CONTAINING TRIKETOIMIDAZOLIDINE PRECONDENSATES, THEIR USE, AND A PROCESS FOR PREPARING A TRIKETOIMIDAZOLIDINE PRECONDENSATE COMPOSITE SUITABLE FOR THIS PURPOSE

[75] Inventors: Franz Jakob, Hofheim am Taunus; Ernst Höroldt, Kelkheim, both of Fed. Rep. of Germany

[73] Assignee: Hoechst Aktiengesellschaft, Fed. Rep. of Germany

[21] Appl. No.: 413,472

[22] Filed: Aug. 31, 1982

[30] Foreign Application Priority Data

Feb. 20, 1982 [DE] Fed. Rep. of Germany ....... 3206128

[51] Int. Cl.$^3$ .............................................. C08K 3/04
[52] U.S. Cl. .................................... 523/156; 523/400; 524/35; 524/41; 524/507; 524/538; 524/539; 524/541; 525/127; 525/419
[58] Field of Search ................. 524/507, 589, 590, 35, 524/41, 539, 538, 541; 523/156, 400; 525/127, 419

[56] References Cited

U.S. PATENT DOCUMENTS 4,324,836  4/1982  Patton ................................ 524/589
4,325,860  4/1982  Johnson ............................. 524/589
4,330,453  5/1982  Patton ................................ 524/589

FOREIGN PATENT DOCUMENTS 0071379  2/1983  European Pat. Off. ............ 524/589
1920845  4/1969  Fed. Rep. of Germany .
1916932  4/1969  Fed. Rep. of Germany .

Primary Examiner—Lewis T. Jacobs
Attorney, Agent, or Firm—Charles A. Muserlian

[57] ABSTRACT

Molding composition containing
(a) 2,4,5-triketoimidazolidine precondensates containing terminal oxamide ester, urethane and/or isocyanate groups and
(b) customary organic and/or inorganic fillers, which contain the triketo compound a) as a reactive filler in the form of a composite of a$_1$) a 2,4,5-triketoimidazolidine precondensate pulp and a$_2$) a pulp of other fiber-forming polymers or, instead of this pulp a$_2$), fibers made of 2,4,5-triketoimidazolidines and/or other materials and
(c) at least one further reactive component of a binder from the group consisting of phenolic resins, amine resins, epoxide resins, polyester resins, hydrocarbon resins containing functional groups and/or polymerization resins containing functional groups, their use for manufacturing radiation-, light- and/or heat-resistant and/or abrasion-resistant shaped articles, and a process for preparing a composite of 2,4,5-triketoimidazolidine precondensate pulp and fibers by spraying a solution of a triketoimidazolidine precondensate in organic solvents together with fibers or injecting a solution of the precondensate into a suspension of fibers in a coagulating bath.

13 Claims, No Drawings

MOLDING COMPOSITIONS CONTAINING TRIKETOIMIDAZOLIDINE PRECONDENSATES, THEIR USE, AND A PROCESS FOR PREPARING A TRIKETOIMIDAZOLIDINE PRECONDENSATE COMPOSITE SUITABLE FOR THIS PURPOSE

It is known to prepare molding compositions containing inorganic and/or organic fillers. Asbestos fibers have hitherto been extensively used for this purpose, owing to their favorable physical properties, such as refractoriness, high abrasion resistance and high hardness. For example, mixtures of this type exhibited high friction when used as brake linings. As is known, asbestos is a crystalline natural product. The processing of these crystals is associated with the serious disadvantage that respiratory organs are considerably impaired, so that even lung cancer can arise. Demands have therefore been made for some time to replace this fiber as far as possible.

It is also known to produce "aramide fibers" based on terephthalic chloride and p-phenylenediamine ("Research Disclosure", February 1980, pages 74/75) and to process these fibers in the form of a pulp of fine fibers (fibrilated) of various lengths to give flat articles such as paper, if appropriate combined with other fibers such as those based on cellulose, polyester, polyamide or asbestos.

Another publication ("Textile Institute and Ind.", February 1980) describes the use of aramide fibers as an inner textile lining for rubber articles, in particular for automotive tyres, as reinforcers for plastics and for various applications, not mentioned in particular, in the automotive sector and in aeronautics and space travel. This publication also mentions the replacement of asbestos or glass fibers in clothing coated with aluminum. It is also known to use these fibers as a replacement for asbestos in clutches and brake linings ("Plastverarbeiter", volume 31, 1980, pages 527 and 528).

However, these aramide fibers have the disadvantage that, like asbestos, they are crystalline, that the polycondensation is very involved and that spinning takes place from concentrated sulfuric acid at an elevated temperature, for example 80° C. This presents considerable practical difficulties. The crystalline character of these fibers requires an additional stretching and orienting process, so that the manufacture becomes relatively complicated.

It has also already been proposed to use carbon fibers for clutches and brake disks. However, under thermal stress and strain there is the risk of a structural change from the diamond lattice to the graphite lattice with the result that the strength and hardness are impaired and graphite-like sliding properties are produced. It is also known that under certain conditions carbon is absorbed from such fibers by metals (for example steel) and leads to an impairment of the properties, for example through metal carbide formation.

The preparation of triketoimidazolidine rings from oxamates and isocyanates and, if appropriate, polycarboxylic acids while forming condensation products containing amide and/or imide groups is also known. It has also already been proposed to use these condensation products containing amide and/or imide groups for producing fibers, shaped articles and surface coatings containing mineral fillers, preferably glass fibers or graphite.

To avoid the abovementioned problems the object of the present invention is to replace asbestos fibers in molding compositions as far as possible by another filler which does not require as complicated a method of production as the known aramide fibers and which, in addition, is less crystalline, i.e. to the extent even of having an amorphous structure with the associated benefits.

The invention relates to a molding composition containing (a) 2,4,5-triketoimidazolidines containing terminal oxamide ester, urethane and/or isocyanate groups and (b) customary organic and/or inorganic fillers, and which contains the triketo compound (a) in the form of an amorphous precondensate as a reactive filler and (c) at least one further reactive component of a binder from the group consisting of phenolic resins, amine resins, epoxide resins, polyester resins, hydrocarbon resins having functional groups and/or polymerization resins having functional groups.

The invention also relates to the use of such molding compositions for preparing radiation-, light-and/or heat-resistant and/or abrasion-resistant shaped articles, for example in the form of abrasion-resistant structural members, and, in particular, for preparing brake linings, clutch disks or cylinder head seals.

Unlike the known aramide fibers, the triketoimidazolidine fillers used according to the invention can be prepared in the form of a pulp by spraying, namely directly by extruding a solution in organic solvents through suitable nozzles into a coagulation medium, for example water. Working with concentrated sulfuric acid at an elevated temperature is thus avoided. Safety at work is increased thereby. These small particles are obtained in amorphous form, that is in the form of small, irregular particles, which implies a large specific surface area. This fact likewise ensures a high capacity for binding the reactive components simultaneously present in the mixture according to the invention, the fillers and, if present, other reinforcing materials. However, these triketo compounds can also be processed by simply spinning them, not only by the wet method but also by the dry method, into filaments of any titer. A particular advantage of the triketo compounds is that it is also possible to produce fibers in a dry-spinning process, without the use of added solvents not already present, and of water, for example in the stretching stage or for washing, i.e. that it is possible to obtain a solvent-free, stretched yarn by using a dry-spinning process alone or together with a heat treatment. All these filaments can be processed without problems even into fibers cut to a very short length, for example to about 2.6 mm.

The triketo compounds used according to the invention also permit the production of pulverulent or pulpy products by spray-drying.

If such molding compositions contain the triketoimidazolidine precondensates in the form of fiber or pulp material, asbestos fibers can be replaced in the manufacture of brake linings and of other shaped articles, for example frictional linings, seals structural members. The use of pulp of such precondensates does not cause any problems in the preparation and processing of the mixtures, and the heat resistance and the adhesive and binding capacity of the pulp in the molding compositions are excellent. Furthermore, the frictional linings manufactured therewith are distinguished by good wear properties.

However, it has also been found that the properties of the molding compositions, and of the shaped articles produced therefrom, can be improved still further when the 2,4,5-triketoimidazoline compound (a) used is an amorphous precondensate containing terminal oxamide ester, urethane and/or isocyanate groups in the form of a composite of ($a_1$) a 2,4,5-triketoimidazolidine precondensate pulp and ($a_2$) a pulp of other fiber-forming polymers or, instead of this pulp ($a_2$), fibers made of 2,4,5-triketoimidazolidines and/or other materials. The composite is preferably prepared by injecting the solution of a 2,4,5-triketoimidazoline precondensate into a suspension of fibers.

Molding compositions obtained in this improved embodiment are distinguished by the fact that composites made of triketoimidazolidine precondensate pulp (shortened to "pulp" below) effect not only excellent frictional, sealing and solidification properties but also an increase in the thermal stability under load in seals. The composites used according to the invention can easily and homogeneously be incorporated in the molding compositions, and do not cause any lumps even in the case of very fine fibers of less than 3 dtex and short lengths of less than 10 mm. Phenomena of the type occasionally encountered in the case of molding compositions which contain suspended fibers which, for example in a calendering step to give stuctural members and seals, are oriented in such a way that they are incorporated in the molding compositions in a parallel arrangement and then exert the reinforcing and solidification properties desired only in this one direction, namely parallel to the fiber axis, do not arise when using composites proposed according to the invention. In addition, the tensile strength and the initial modulus are further increased, a fact which has a beneficial effect in some areas of application, such as clutch linings.

Those composites are particularly preferably used in which the fibers used are firmly bonded in tangled position to the pulp and are very largely present in tangled position even after the processing into shaped articles. In particular those composites of pulp and fibers where the fibers are bound in complete tangled position can exert their reinforcing capacity in the molding compositions isotropically in all directions, a feature known hitherto only from asbestos, and can be homogeneously distributed and readily incorporated without difficulty in the molding compositions, where not only the favorable properties of the pulp, for example adhesion promotion, heat resistance and abrasion resistance, but also those of the fibers used, for example high tensile strength and high initial modulus, complement or add to, one another in an optimal manner.

Composites of this type can advantageously be prepared by spraying, in particular by extruding, a precondensate solution in organic solvents, preferably aprotic ones miscible with water, through suitable nozzles into a suspension, for example a slurry, of the reinforcing fibers in a coagulation bath in which the precondensate and the fiber are not soluble, for example into water. The coagulation medium used can, however, also be solvents which are not miscible with water and which can be easily separated, for example by distillation, from the aprotic solvent, such as toluene, xylene and higher alcohols, whereby the recovery of the aprotic solvents can in many cases be facilitated. Possible solvents are aprotic solvents, in particular N-methylpyrrolidone or even dimethylformamide, dimethylacetamide, dimethyl sulfoxide or cyclohexanone.

In another method for preparing the composites, precondensate and fibers of suitable length, for example of the length indicated below, are simultaneously sprayed through a multimaterial nozzle in a spraying tower or on other suitable units.

Suitable fibers are the known commercially available products, for example those having a relatively high initial modulus and good heat resistance, such as polyaramides, for example the polyamides of isophthalic or terephthalic acid with m- or p-phenylenediamine, polyacrylonitriles, namely homopolymers and copolymers with, for example, acrylates such as those of methanol or ethanol, polyoxadiazoles, polybenzimidazoles, fibers based on phenolic resins or cellulose, such as rayon and cellulose acetates, carbon fibers and of course also fibers made of polytriketoimidazolidines. The length and thickness of the fiber can be varied within wide limits according to the intended use. The fiber thickness is general between 0.2 and 12, preferably between 0.4 and 6 dtex. The length is in general from 1 to 100 and preferably from 3 to 10 mm. The use of mixtures of various fiber types is also possible and can be advantageous for certain purposes.

The ratio of pulp to fiber in the composite can also be varied within wide limits, which are affected also by the length and thickness of the fiber. The ratio of pulp to fiber is in general 5:1 to 1:5, preferably 3:1 to 1:3.

If the composite is prepared by the coagulation method, the concentration of fiber in the coagulation bath is generally 1–20 g/l. In the case of spraying in the spray tower, amount and temperature of the spraying air and of the type of spraying nozzle used must be adapted to the chemical nature of the fiber and especially to its length and thickness.

The choice of fiber component i.e. its chemical composition, has of course an effect on the application areas of the molding compositions. For example, if shaped articles are to be manufactured which will not be subjected to extremely high temperatures, polyacrylonitriles can be used. For shaped articles subjected to relatively high thermal stress and strain differently based fibers, for example polyaramides and, in particular, carbon fibers, are suitable. Provided the fiber-forming polymers also form pulp, mixtures of pulps of triketoimidazolidine precondensate and those polymers, such as polyacrylonitriles, can also be used. In this case, the solutions of the polymers used are mixed with each other and conjointly sprayed. The fibers used can of course also be subjected to a customary pretreatment such as roughening of the surface or fibrilating by means of chemical and/or mechanical methods known, for example, from paper production technology.

In a further embodiment, the molding compositions can be improved still further by leaving a small amount, for example up to 15% by weight, of aprotic, strongly polar solvents, for example of the abovementioned solvents, in the pulps or composites. This small amount can be, for example, 1–10, preferably 2 to 5% by weight. Adoption of this measure can achieve that the products remain fluid under pressure and at an elevated temperature and behave like thermoplastics which have excellent adhesion to the other components of the molding compositions. In other cases it has been found to be advantageous to reduce the solvent content to less than 1, preferably to less than 0.5, % by weight.

The portions of pulp are obtained in amorphous form even in the composites and thus produce the abovementioned advantages.

The triketoimidazolidine precondensates mentioned are as a rule prepared by reacting bis-oxamide esters with diisocyanates alone or combined with at least dibasic carboxylic acids at an elevated temperature, for example from 50 to 200, preferably 50° to 180° C. Examples of such reactions are described in German Pat. No. 1,916,932, German Offenlegungsschrift No. 1,920,845, German Offenlegungsschrift No. 2,030,233, German Offenlegungsschrift No. 2,139,005 and German Offenlegungsschrift No. 2,303,239. The expression "precondensates" indicates not only the polymeric or oligomeric character of these substances but also their capacity for further reaction involving enlargement of the molecule. The precondensate can be prepared in a customary manner from bis-oxamide esters and diisocyanates alone or combined with at least dibasic polycarboxylic acids at an elevated temperature, for example within a range of 50 to 200, preferably 50° to 180,° C. Suitable components are in particular 4,4'-bis(ethoxalylamino)diphenylmethane, trimellitic anhydride and 4,4'-diisocyanatodiphenylmethane. The precondensate can be converted, and solidified at 150° to 480°, preferably 180° to 350,° C. to give a product with a higher molecular weight.

The reactive terminal groups of the precondensates, i.e. the oxamide ester groups and the isocyanate and/or urethane groups, can react under the conditions under which molding compositions are processed also with the remaining reactive components or with one another to give new 2,4,5-triketoimidazolidine rings and an increased molecular weight and/or with the remaining reactive components of mixtures according to the invention. This leads to a still more intensive degree of bonding between the triketoimidazolidines and the other reactive substances, so that very stable adhesion is obtained in addition to the strengthening effect. In certain cases, a small content of solvents, for example of N-methylpyrrolidone, in the triketoimidazolidine can benefit this effect further. The ability to increase the weight of the molecule is a considerable advantage over polyaramide systems, because low molecular weight systems having low viscosity, ready solubility and other properties essential for easy processability may be used which can be converted, for example by treatment at an elevated temperature, into high molecular weight systems with simultaneous shaping are suitable for molding compositions in accordance with the invention.

In the pulps the triketo compounds are present in the form of fibrids, ie. finely divided fibers, whose length and diameter can vary within wide limits, similar to the case of asbestos where this is also considered a desirable property. In general the length is more than 1 mm and the diameter is more than 2, preferably at least 3, $\mu$m. If desired, length and diameter can also be chosen to be smaller. The use of the composites represents no risk whatsoever, either of respirability or to the processor.

The properties of the fibrids can be largely controlled by suitable choice of the conditions in the preparation of the pulp, such as concentration in the solution, temperature, extrusion pressure and nozzle dimensions. Thus, for example, a higher concentration of triketo compounds causes the fibrids to be longer and have a greater diameter. By using low solvent concentrations and viscosities with corresponding overpressure in the solution to be extruded it can be achieved that no continuous filament forms but a fibrid product is obtained. The choice of nozzle diameter is critical especially for the diameter of the fibrids. If a non-solvent, for example alcohol, is added to the solution to be extruded, relatively short and/or relatively thin fibrids can be obtained.

The surface properties of the fibrids depend not only on the extrusion pressure of the solution but also on the coagulation medium into which the solution is extruded. If the solution is extruded, for example, into the non-solvent water, a large specific surface area is obtained. If, on the other hand, the coagulation bath contains a portion of solvent for the substance, for example of the abovementioned aprotic solvent, a fibrid is obtained which is smooth and has a small specific surface area. The water retention capacity of fibers made of triketo compounds is in general 8 to 200% by weight, usually about 10% by weight, while the water retention capacity of the pulp is usually between 50 and 200% by weight. The larger the specific surface area the larger the water retention capacity. The specific surface area of the pulp or of triketoimidazolidine fibrids contained in the composites is, for example, 10 to 100 m$^2$/g, the fibrid length is in general in the mm range, for example at most 10 mm, preferably at most 5 or 7 mm, and the fibrid diameter is within the $\mu$m range, for example at most 100 $\mu$m, preferably at most 30 $\mu$m.

The specific heat of the precondensates can vary according to the chemical structure of the triketo compounds. The specific heat can be, for example, 0.22 to 0.38, preferably 0.28 to 0.36 cal/(g.°C.). This parameter is of importance when shaped articles manufactured from molding compositions according to the invention are subjected to, for example, considerable mechanical stress, such as friction. The specific heat of this triketo compound is approximately equal to that of asbestos. As in the case of the latter, excess heating by friction is also avoided in shaped articles made from molding compositions according to the invention; the shaped articles manufactured therefrom have a good heat resistance and dimensional stability under heat. The triketo compounds also have an excellent chemical resistance, in particular very good resistance to alkali.

The fact, found by X-ray analysis, that triketo precondensates, in particular the pulp component, do not contain any microcrystalline fractions whatsoever is of very high significance. Rather, they are completely amorphous. The fibers which can be used for composite formation are admittedly crystalline, but do not contain any microcrystalline fractions of respirable dimensions. The result is that the fibers and the composite can also not be split into respirable small particles, as is the case with asbestos. As is known, the ratio of the length to the diameter of asbestos particles is critical for the lung toxicity. This ratio becomes established in the case of asbestos, inter alia, by the ready divisibility and the typical crystal structure. Even when grinding the amorphous materials used according to the invention, for example the composites, dusts having this ratio, characteristic for lung toxicity, of length to particle diameter can virtually not occur.

The fibrids and composites made of triketo compounds contained in molding compositions according to the invention have the essential advantage that they, unlike asbestos, are dust-free; this fact represents a considerable technical advance in that a source of environmental pollution and a health hazard to the processing personnel as well as to consumers is abolished. A further advantageous property of the fibrids and composites is that the triketo compounds are resistant to oils, gasoline and grease, i.e. that their ability to absorb oil is particularly low. This is of importance in particular in practice when shaped articles manufactured from the molding compositions are used, for example, in the motor vehicle sector, mechanical engineering, the building sector or the like. Further advantages of the triketo compounds used are that these compounds are not flammable and that no toxic products are formed under prolonged exposure to high temperatures, for example to a source of ignition. The absence of dust in these products, already mentioned, represents a considerable advantage over the properties of known shaped articles, for which asbestos has hitherto been commonly used. On the other hand, properties such as tensile strength and initial modulus are increased by the fiber component contained in the composite.

The ratio of component (a) to the remaining constituents, in particular to component (c), is in general so chosen that at least 15, preferably at least 30, % of functional groups of component (c) react with the triketo compounds.

Inorganic fillers of mineral, silicate and/or metallic nature and having a high thermal resistance and —provided they are non-metallic fillers—a low heat conductivity, are advantageously used as fillers (b). Examples of suitable fillers of this type are mineral powders such as crushed rock, crushed slate, marble powder, quartz sand, quartz powder, chalk, glass powder, glass fibers, graphite, metal powder, metal chips, metal oxides and customary inorganic pigments. It is also possible to use asbestos fibers as fillers, but only in a minor amount combined with other fillers if health-damaging consequences can be avoided.

Organic fillers such as cellulose fibers, for example wood flour or sawdust, cellulose derivatives, such as cellulose ethers or esters, organic pigments, such as phthalocyanines, quinacridones, anthraquinone pigments or the like, are also suitable. Elastomers and hydrocarbon resins, in each case without functional groups, can also be used as organic fillers. Examples of such hydrocarbon resins are those of monoolefins and-/or diolefins inclusive of cyclic monomers, such as cyclopentadiene or dicyclopentadiene, also of aromatics or of vinyl or allyl compounds or of hydrocarbon fractions as obtained in the distillation of petroleum. Suitable elastomers are in particular natural or synthetic rubbers, such as styrene rubber, acrylonitrile rubber, polybutadiene, butyl rubber, polyisoprene or ethylene/-propylene/diene terpolymer rubber in each case singly or mixed.

In particular cases it can also be advantageous also to add to the molding compositions as component (b), up to 80, preferably up to 20, % by weight, relative to the precondensate content of the pulp component, fibers having a high tensile strength and a high initial modulus, for specific purposes, also having a high heat resistance (for example for the purpose of further improving the properties of frictional articles), for example those mentioned above.

Suitable phenolic resins (component c) are resols or novolaks, the latter together with suitable hardeners, such as hexamethylenetetramine, oxalic acid or the like. Phenol components which can be used are not only unsubstituted but also substituted, monohydric or polyhydric, mononuclear or polynuclear phenols, such as phenol, resorcinol, pyrocatechol, bis-phenols, such as 4,4'-diphenylolpropane, 4,4'-diphenylolmethane or their substitution products, such as monoalkyl or polyalkyl derivatives, for example butylphenol or octylphenol, as such or in the form of mixtures. In particular formaldehyde is possible for use as the aldehyde component.

Suitable amine resins are urea resins, guanamine resins, but preferably melamine resins or their substitution or etherification products, in particular their alkyl derivatives. Also in this case is in particular formaldehyde possible for use as the aldehyde component.

The epoxide resins can be of the aromatic, aliphatic and/or cycloaliphatic type. Examples of suitable epoxide resins are resins containing glycidyl ester and/or ether groups, epoxidized oils, epoxidized fatty acids and their esters, epoxidized polyhydroxy compounds, sugar derivatives having glycidyl radicals, but preferably polyepoxides based on 4,4'-diphenylolpropane and/or 4,4'-diphenylolmethane and epihalogenohydrin, preferably epichlorohydrin.

Suitable polyester resins are customary unsaturated and/or saturated polyesters, alkyd resins, polyetheresters, polyesters which contain amide and/or imide groups but which in each case still have free OH and/or COOH groups, or copolymers having ester groups and also OH and/or COOH groups.

Examples of suitable reactive hydrocarbon resins are those which are in addition modified with carboxylic acid, its anhydride or other reactive groups, such as hydroxyl-containing ester groups or sulfhydryl, sulfide, disulfide and/or sulfochloride groups. Thus, for example, prevulcanized butadiene, isoprene or chloroprene polymers or even sulfochlorinated polyethylene are possible for use as reactive elastomers. Examples of other suitable reactive polymers are acrylic resins having free OH, NH$_2$,

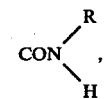

CONH$_2$ and/or COOH groups in which R is alkyl having, for example, 1 to 8 C atoms.

Molding compositions according to the invention have the advantage that environmentally they are considerably more acceptable than comparable compositions containing a significant amount of asbestos fibers.

The triketo compounds and, in particular, the composites are used in many and varied fashion for manufacturing shaped articles. The pulp of the triketo compounds is distinguished by particularly firm adhesion to a very wide variety of materials, such as to the other fillers and the reactive binder. The triketo compounds and, in particular, the composites are highly suitable for strengthening and reinforcing the molding compositions according to the invention. The molding compositions can advantageously be used, inter alia owing to the good alkali resistance of the precondensate, for reinforcing cement-containing shaped parts, for example boards. They are also very highly suitable for those shaped articles which are exposed to strong radiation, light, heat and/or mechanical action, such as shaped parts for medical, industrial and domestic purposes, for example in bone surgery, as elements in mechanical engineering and aircraft, ship and automotive construction, as structural members in electrical engineering, for example for handles and insulating material, in electronics, for example for conductor boards as well as for fittings, clutch, brake and frictional linings, or frictional elements, that is, for example, clutch disks, in particular in the frictional wheel field, and for cylinder head seals or in the building field as structural members for example building boards, thermal insulating material, floor coverings, roof coverings or the like, and also for manufacturing heat-stable as well as chemical-resistant sealing materials.

The invention finally also relates to a process for preparing a composite from triketoimidazolidine precondensate pulp and fibers, wherein the solution of a triketoimidazolidine precondensate in organic solvents which are preferably aprotic, like the examples mentioned above, and miscible with the solvents mentioned below is sprayed simultaneously with, but separately from, the fibers or injected into a suspension of fibers in a coagulation bath, for example halogenated, particularly chlorinated, hydrocarbons, such as methylene chloride, chloroform or carbon tetrachloride, or water, in which the precondensate and the fiber are not soluble. Composites of this type are distinguished by the fact that the fibers used are bonded essentially in tangled position to the pulp.

In the experiments described below % denotes % by weight.

I. Preparation of the triketoimidazolidines (A) 199 g of 4,4'-bis-(ethoxalylamine)-diphenylmethane (0.5 mole) and 96 g of trimellitic anhydride (0.5 mole) were heated after 1 g of lithium benzoate and 5 ml of tributylamine (water content less than 0.05%) had been added to 120° C. together with 544 g of N-methylpyrrolidone, and the mixture was added in the course of 30 minutes to 250 g of 4,4'-diisocyanatodiphenylmethane. The batch was then stirred for 4 to 6 hours at 120° C. until the elimination of $CO_2$ was complete. After the batch had cooled down, 1,060 g of a clear, redbrown, highly viscous condensate solution were obtained. Solids content: about 50%.

(B) 400 g (1 mole) of 4,4'-diethoxalylaminodiphenyl ether were stirred at room temperature with 252 g (1 mole) of 4,4'-diisocyanatodiphenyl ether and 650 g of N-methylpyrrolidone. 7 ml of tri-n-butylamine were added to the pasty mixture. The temperature increased to about 60° C. The mixture was then stirred for 6 hours without heat being supplied. The clear, brownish-yellow solution thus obtained had a viscosity of about 1,400 cP (20° C.).

(C) 398 g (1 mole) of 4,4'-diethoxalylaminodiphenylmethane were dissolved at 70° C. in 800 g of N-methylpyrrolidone with the addition of 10 ml of triethylamine; 500 g (2 moles) of 4,4'-diisocyanatodiphenylmethane were added in portions. The temperature did not exceed 80° to 85° C. After the addition was complete, the batch was stirred for a further 6 hours at room temperature and then diluted with 100 g of a mixture of phenol and cresol (ratio of 1:1). A clear, yellow solution was obtained.

(D) 756 g (3 moles) of 4,4'-diisocyanatodiphenyl ether were heated to 100° C. in 1,154 g of a N-methylpyrrolidone/cyclohexanone mixture (ratio by weight 30:70), and the hot mixture was added after 20 ml of triethylamine had been added in the course of 2 hours to 398 g (1 mole) of bis-(ethoxalylamino)-diphenylmethane. 161 g (0.5 mole) of benzophenonetetracarboxylic acid dianhydride were added after 45 minutes in the course of one hour with vigorous stirring. During this addition the viscosity increased very considerably. After stirring for three hours at 100° to 110° C. a clear, red-brown polymer solution was obtained. Yield: 2,400 g (solids content: about 52%).

(E) 272 g (0.5 mole) of 4,4'-bis-(4-carboxyphthalimido)-diphenylmethane and 199 g (0.5 mole) of 4,4'-bis-ethoxalylamino)-diphenylmethane were heated to 120° C. in 1,040 g of N-methylpyrrolidone, 5 ml of tributylamine were added, and the mixture was added in the course of 90 minutes to 375 g (1.5 moles) of 4,4'-diisocyanatodiphenylmethane. Fine crystals precipitated from the originally clear solution.

The condensation reaction was then carried out at 190° to 198° C. until the now completely clear, viscous reaction mixture produced a clear, viscous polymer solution at room temperature. This was the case after about eight to ten hours. Yield: 1,790 g of a clear, highly viscous polymer solution.

(F) 98.4 g (0.2 mole) of crude 1,4-bis-(p-ethoxalylaminophenoxy)-benzene (melting point 165° C.) and 19.2 g (0.1 mole) of trimellitic anhydride were dissolved at 130° C. in 100 ml of dimethylacetamide, and 0.5 ml of tribenzylamine was added to the solution. A mixture of 47.5 g (0.15 mole) of 4,4'-diisocyanatodiphenylmethane and 45.4 g (0.18 mole) of 4,4'-diisocyanatodiphenyl ether was added at this temperature in the course of one hour. The batch was then stirred at 140° C. for four hours, cooled down to 70° C. and stirred into 100 g of a technical-grade cresol mixture. After the batch had cooled down to room temperature 402 g of a clear, highly viscous polymer solution the solids content of which was about 50% were obtained.

(G) 564 g (1 mole) of 4,4'-bis-(4-carboxyphthalimido)-diphenyl sulfone, and 548 g (1 mole) of 4,4'-bis-(4-carboxyphthalimido)-diphenyl ether were suspended at 60° C. in 2,800 ml of N-methylpyrrolidone and 2,000 ml of dimethyl sulfoxide in a 10 liter three-necked flask. 67 g (0.2 mole) of the azomethine (melting point=300° C. with decomposition) formed from 2-hydroxynaphth-1-aldehyde and 5-aminoisophthalic acid were then added. The mixture was then heated to 140° C. 199 g (0.5 mole) of 4,4'-bis-(ethoxalylamino)-diphenylmethane, 176.4 g (0.7 mole) of 4,4'-diisocyanatodiphenyl ether and 500 g (2.0 moles) of 4,4'-diisocyanatodiphenylmethane were added at this temperature in the course of 3 hours. The batch was stirred at 150° C. until the elimination of $CO_2$ was complete (about 6 to 8 hours). The temperature was increased to 200° C., after 2 g of tributylamine had been added, and maintained for 4 hours. 400 ml of cyclohexanone and 200 ml of diethylbenzene were then added to dilute the batch. After cooling down a pale orange-yellow, highly viscous polymer solution was obtained. The solids content was about 25% by weight. Yield: 7,200 g. The inherent viscosity of the polymer was 0.44 (20° C.), measured in a 1% strength solution.

(H) 158.5 g (0.8 mole) of 4,4'-diaminodiphenylmethane were dissolved at room temperature with stirring in 1,280 ml of N-methylpyrrolidone. 307.2 g (1.6 moles) of trimellitic anhydride were then added in portions at 80° C. After toluene had been added as an azeotropic agent, the temperature was increased to 180° C. and the condensation reaction was continued until no more water was eliminated. This was the case after about 2 hours. 79.6 g (0.2 mole) of 4,4'-bis-(ethoxalylamino)-diphenylmethane and 11.4 g (0.04 mole) of azomethine (melting point=287° C.) formed from 5-aminoisophthalic acid and salicylaldehyde were then added. After the mixture had been cooled down to 160° C., 250 g (1 mole) of 4,4'-diisocyanatodiphenylmethane were added. The condensation reaction was carried out at 160° to 180° C. until the elimination of $CO_2$ was complete. The temperature was then increased to 205° C., and the alcohol liberated in the condensation was distilled off via a packed column in such a way that the head temperature did not exceed 125° C. The batch was then cooled down and diluted with 100 ml of dimethylacetamide, 100 ml of hexamethylphosphoramide and 90 ml of cyclohexanone.

2,300 g of a yellow-brown, highly viscous solution containing about 31% of solids were obtained. The inherent viscosity of the polymer, measured in a 1% strength solution, was 0.50 (20° C.).

(I) 218.4 g (0.4 mole) of 4,4'-bis(4-carboxyphthalimido)-diphenylmethane and 3.55 g (0.01 mole) of 5-(4-carboxyphthalimido)-isophthalic acid were dissolved in 400 ml of N-methylpyrrolidone, and the solution was stirred at 120° C. into 39.8 g (0.1 mole) of 4,4'-bis-(ethoxalylamino)-diphenylmethane. After the batch had cooled down to 100° C. a solution of 130 g (0.52 mole) of 4,4'-diisocyanatodiphenylmethane in 260 ml of N-methylpyrrolidone was added dropwise in the course of 2 hours. 0.5 g of dibutyltin dilaurate was then added and the condensation was carried out at 170° C. until the elimination of $CO_2$ was complete. The temperature was increased to 200° C. and 2.85 g (0.01 mole) of the azomethine formed from 5-aminoisophthalic acid and salicylaldehyde were added. The alcohol liberated in the condensation was distilled off at this temperature as described in Example H. The batch was then heated to 205° C., 4.9 g of cobalt octoate, dissolved in 20 g of dimethyl sulfoxide, were added, and the batch was diluted with 200 ml of N-methylpyrrolidone. After the batch had cooled down to room temperature 1,150 g of a clear, highly viscous, brown-orange solution having a solids content of about 29% were obtained. Inherent viscosity: 0.67 (1% strength solution of the solid polymer in N-methylpyrrolidone at 20° C.).

(J) 79.2 g (0.4 mole) of 4,4'-diaminodiphenylmethane and 153.6 g (0.8 mole) of trimellitic anhydride were stirred with 200 ml of N-methylpyrrolidone and 200 ml of dimethyl sulfoxide. After xylene had been added as an azeotropic agent the condensation was carried out at 190° C. until $H_2O$ was no longer eliminated. The batch was then cooled down to 120° C. and 2.5 g of triethylamine and 0.5 g of butyl titanate were added. 39.8 g (0.1 mole) of the azomethine formed from 5-aminoisophthalic acid and 2-hydroxynaphth-1-aldehyde were then added. 130 g (0.52 mole) of 4,4'-diisocyanatodiphenylmethane dissolved in 260 ml of N-methylpyrrolidone were then added dropwise at 100° C. in the course of one hour. After the addition was complete the batch was heated to 202° C. and the condensation was completed at this temperature in the course of 6 hours. After the batch had cooled down to 160° C. it was diluted with 200 ml of cyclohexanone. 1,160 g of a pale yellow and clear polymer solution containing about 30% of solids were obtained. The viscosity of the solution was about 24,000 cP (20° C.).

(II) Preparation of the fillers and composites (A) A 12% strength triketoimidazolidine precondensate solution in accordance with I(A) was heated with stirring in a pressure vessel. The hot solution was let down, through a spray tube, into a receptacle filled with water. The resulting wet pulp was filtered from the water and freed by washing from N-methylpyrrolidone. The washed pulp was whirled about in a fluid mixer and then dried in a vacuum drying cabinet. The pulp obtained had a bulk density of 33.3 g/l, a residual content of N-methylpyrrolidone of 0.2%, and a water retention capacity (in accordance with DIN 53,814) of 161.3%. The specific surface area was 39 $m^2/g$; length of the fibrids 1 to 3 mm, diameter about 3 to 8 $\mu m$.

(B) A 12% strength solution of the triketoimidazolidine in accordance with I(B) in N-methylpyrrolidone was fed in portions into an autoclave. This solution was sprayed from the autoclave at room temperature under an over-pressure by means of compressed air into running water. The wet pulp was washed with water and then dried in a circulating air cabinet to a residual moisture content of 2.5%. The longest fibrids in the pulp have a length of 7 mm and a diameter of about 12 $\mu m$.

(C) A 30% strength deaerated and warmed solution at 40° C. of the precondensate prepared in accordance with I(H), in N-methylpyrrolidone, was spun into filaments through a spinneret and via a dry-spinning chamber. The filament was taken out of the chamber and wound up. The filament, subsequently washed with hot water, was stretched at an elevated temperature and then cut into 100 mm long staple fiber. The fiber had a titer of 1.9 dtex, a tensile strength of 26 cN/tex and an elongation at break of 6%. The fiber still contained 1.6% of N-methylpyrrolidone.

(D) A 22% strength solution of the precondensate prepared in accordance with I.(I), in N-methylpyrrolidone, was spun into filaments on a wet-spinning line. The hot solution at 60° C. was spun through a spinneret into an aqueous coagulating bath containing hot N-methylpyrrolidone. The filament was wet-stretched via takeup rolls in a heated stretching bath. The filament was then dried on hot rolls, stretched again and wound up. The filament obtained had an individual titer of 15.5 dtex., a tensile strength of 10 cN/tex and an elongation at break of 40%, and shrunk by 0.1% on boiling. The filament was cut into a 2.6 mm long staple fiber.

Some of the cut fibers were dispersed in water, fibrilated by friction on a set of rolls (refiner) and dried in a thin layer at room temperature.

(E) A 12% strength solution of the precondensate in accordance with I(A), N-methylpyrrolidone, was let down from an autoclave at room temperature under an over-pressure by means of compressed air into a vessel filled with water in which an amount, of the same weight as the precondensate, of 4.4 mm long 1.9 dtex polyacrylonitrile fibers was suspended. The wet composite of pulp and fibers obtained in the spraying was filtered from the water and freed from N-methylpyrrolidone by washing. The washed composite was whirled about in a fluid mixer and then dried in a drying cabinet under reduced pressure. The length of fibrids in the pulp was 2 to 6 mm and the diameter was 5–12 $\mu m$.

(F) The procedure of II(B) was repeated with the difference that a solution of the precondensate in accordance with I(C) in N-methylpyrrolidone, was mixed with stirring with the same amount by weight of a 10% strength solution of polyacrylonitrile in dimethylformamide and then processed. The longest fibrids in the pulp were 10 mm long; the diameter was about 15 $\mu m$.

III. Molding Compositions (Examples 1 to 12)

(1) A solution of 850 g of a phenol novolak (molar ratio phenol:formaldehyde=1:0.85), which had been prepared in the presence of 9 g of hydrochloric acid as a catalyst, and of 150 g of hexamethylenetetramine in 1,000 g of methanol was stirred at 80° C. until a dispersion had formed, i.e. incompatibility with the solvent had arisen. This approximately 50% strength dispersion was processed into a molding composition for the impregnation method as follows: 8 kg of the fibrids in accordance with II(A) were mixed in a kneader having sigma blades with 5.74 kg of this dispersion, 100 g of zinc stearate as lubricant, 20 g of partially hydrolyzed ester wax and 140 g of nigrosine base as black dyestuff. The solvent was then removed by drying at 80° C. A molding composition was obtained in the form of free-flowing granules having a very uniform particle size.

(2) 8 kg of a 50% strength solution of an epoxide resin novolak prepared from bisphenol A and epichlorohydrin in a molar ratio of 1:2.2 (epoxide number 6.6 and molecular weight 600), in methyl ethyl ketone, was stirred at 40° to 80° C. with 400 g of diethylenetriamine until a dispersion had formed. 4 kg of this approximately 50% strength dispersion were mixed as in Example 1 with 1.1 kg of glass fibers (staple length 6 mm), 1.1 kg of dried pulp in accordance with II(B), 3.74 kg of limestone, 100 g of zinc stearate and 20 g of partially hydrolyzed ester wax and further processed as in Example 1. After removal of the solvent the molding composition obtained is preferentially suitable for shaped parts in electrical engineering. A different aliphatic polyamine can also be used instead of the diethylenetriamine.

(3) 8 kg of a 50% strength acetone solution of an unsaturated polyester resin to which 40 g of cyclohexanone peroxide had been added and composed of 2 moles of maleic anhydride, 1 mole of phthalic anhydride and 3 moles of propane-1,3-diol was polymerized at 80° to 90° C. until the product was incompatible with acetone. The polymerization was stopped by adding 0.5% by weight of hydroquinone, relative to polyester, as an inhibitor. The dispersion was processed into a molding composition as in Example 2.

(4) The condensation of a melamine resin from melamine and aqueous formaldehyde (30% strength) in a molar ratio of melamine:formaldehyde=1:1.8 was catalyzed with an amount of barium hydroxide solution such that a pH value of 8.8 was produced in the solution. The state at which a dispersion started to form in the aqueous phase was arrested as soon as a solid phase appeared. 8 kg of this approximately 50% strength dispersion were mixed with 4.88 kg of wollastonite, 1 kg of the fibers in accordance with II(C), 100 g of calcium stearate and 20 g of a commercially available fatty acid amide and further processed into a molding composition, both steps being carried out as in Example 1.

(5) A batch of 400 g of a crystallizable, melted, unsaturated polyester of equivalent amounts of 2,2-dimethylpropane-1,3-diol and dicarboxylic acid comprised of 90 mole % of fumaric acid and 10 mole % of terephthalic acid, 60 g of diallyl phthalate, 60 g of styrene, 30 g of a 50% strength solution of benzoyl peroxide in dioctyl phthalate, 30 g of zinc stearate and 820 g of limestone was processed in a heated mixer at 40° to 50° C. After homogenization 450 g of a fiber in accordance with II(B) and having a length of about 6.5 mm were added to the mass. The voluminous warm material solidified after a brief time at room temperature. The texture was further improved for the molding composition by treatment in a cross beater mill.

(6) 400 g of a crystallizable, melted, unsaturated polyester of 50 mole % of diphenylolpropanedioxyalkyl ether, 25 mole % of fumaric acid and 25 mole % of terephthalic acid, 80 g of diallyl phthalate, 30 g of a 50% strength solution of benzoyl peroxide in dimethyl phthalate, 30 g of zinc stearate, 1,200 g of limestone, 120 g of kaolin and 180 g of a fiber in accordance with II(A) and having a length of about 2.5 mm were mixed in a heated mixer at 50° C., and the doughy warm mass was passed through unheated rolls. The thin skin obtained became rigid after a short time at room temperature. After comminution in a cross beater mill a dry, non-caking, free-flowing molding composition was obtained.

(7 to 12) Examples 1 to 6 were repeated with the difference that fibrids or pulp or fibers were in each case replaced by the same amount by weight of composites, namely:

Example 7: 8 kg of composite in accordance with II(E).

Examples 8 and 9: 1.1 kg each of the mixed pulp in accordance with II(F)

Example 10: 1 kg of composite in accordance with II(E)

Example 11: 450 g of composite in accordance with II(E)

Example 12: 180 g of the composite in accordance with II F and in addition 60 g of a polyaramide fiber having a length of 4.4 mm and a linear density of 2.4 dtex.

We claim:

1. A molding composition comprising
(a) as a reactive filler, 2,4,5-triketoimidazolidine precondensates having terminal groups selected from oxamide ester groups, urethane groups, isocyanate groups and mixtures thereof in the form of a composite of ($a_1$) a 2,4,5-triketoimidazolidine precondensate pulp and ($a_2$) a pulp of other fiber-forming polymers or, instead of this pulp ($a_2$), fibers made of 2,4,5-triketoimidazolidines, polyaramides, polyacrylonitriles, polyoxadiazoles, polybenzimidazoles, fibers based on phenolic resins or cellulose or carbon or mixtures of various fibers
(b) a customary filler selected from the group consisting of organic fillers, inorganic fillers and mixtures thereof, and
(c) at least one further reactive component of a binder which is a polymerisation resin having functional groups.

2. A molding composition as claimed in claim 1, wherein the polymerisation resin is a polycondensation resin selected from the group consisting of phenolic resins, amino resins, epoxy resins and polyester resins.

3. A molding composition as claimed in claim 1 wherein the polymerization resin is a hydrocarbon resin.

4. A molding composition as claimed in claim 1 containing a composite prepared by injecting a solution of a 2,4,5-triketoimidazolidine precondensate into a suspension of fibers.

5. A molding composition as claimed in claim 4 wherein the composite has been prepared by injecting a solution of a 2,4,5-triketoimidazolidine precondensate in an aprotic organic solvent, miscible with water, into an aqueous suspension of the fiber in a coagulation bath in which the precondensate and the fiber are not soluble.

6. A molding composition as claimed in claim 1, wherein the fibers used in the composite are firmly bonded in tangled position to the pulp.

7. A molding composition as claimed in claim 1 which additionally contains, as an ingredient of component (b), up to 80% by weight of fibers, calculated to the amount of precondensate in component (a).

8. A molding composition as claimed in claim 1 wherein the fiber component has a length from 1 to 100 mm, a thickness from 0.2 to 12 dtex and wherein the proportion of the pulp to the fiber in the composite of component (a) is in the range from 5 to 1 to 1:5.

9. A shaped article comprising the hardened shaped molding composition as claimed in claim 1.

10. An article as claimed in claim 1 which is in the form of a brake lining, a clutch disk or a cylinder head seal.

11. An article as claimed in claim 9, in which the fibers are largely present in tangled position even after the processing into the shaped article.

12. A process for preparing a composite from a 2,4,5-triketoimidazolidine precondensate pulp and fibers which comprises spraying a solution of a 2,4,5-triketoimidazolidine precondensate in an organic solvent simultaneously with, but separately from, the fibers or injecting a solution of a 2,4,5-triketoimidazolidine precondensate into a suspension of fibers in a coagulation bath in which the precondensate and the fiber are not soluble.

13. A process as claimed in claim 12, wherein the solvent is N-methylpyrrolidone.

* * * * *